Aug. 17, 1971 — R. H. HEDRICK — 3,600,139
CRYSTALLIZATION APPARATUS
Filed Aug. 14, 1967 — 2 Sheets-Sheet 1

3,600,139
CRYSTALLIZATION APPARATUS
Robert H. Hedrick, Warren, Pa., assignor to Struthers Scientific and International Corporation
Filed Aug. 14, 1967, Ser. No. 660,425
Claims priority, application Great Britain, Aug. 23, 1966, 37,650/66, 37,702/66
Int. Cl. B01d 9/02
U.S. Cl. 23—273    1 Claim

ABSTRACT OF THE DISCLOSURE

Crystals are grown in a rotating solution to increase the acceleration to which they are subjected and increase the growth rate of the crystals.

BACKGROUND OF THE INVENTION

Crystallizers cool a saturated solution to cause crystal growth therein. Direct contact cooling with a refrigerant may be used, heat transfer to a cooled wall may be used, or vacuum evaporation of the solution to cool it may be used. In vacuum evaporation crystallization, as in other methods, the cooled solution may be passed into a chamber to allow crystal growth in the solution to form a crystal slurry in the mother liquor from which product crystals may be recovered. Some examples of product crystals which are recovered from a water solution are $CuSO_4 \cdot 5H_2O$; $Na_2Cr_2O_7 \cdot 2H_2O$; $KCl$; and the like.

Two basic and well known equations define such crystal growth. These equations are:

(a) $$\frac{Kd}{D} = B \left(\frac{pvd}{u}\right) 0.6 \left(\frac{u}{MD}\right) 0.3$$

(b) $$g = (c_t - c) \left[\frac{V}{4} \phi m V_0 n \exp. (-u/kT)\right]$$

Equation a is known as the Mass Transfer Equation and Equation b is known as the Surface Reaction Equation. In both the above equations the rate of crystal growth is proportional to the term $v$. In both equations, the term $v$ is defined as the sinking rate or velocity of the crystal in the mother liquor. This invention increases the growth rate of crystals by increasing the sinking velocity of the growing crystals by accelerating the mother liquor.

SUMMARY OF THE INVENTION

The rate of crystal growth in a crystallizer is increased by imparting a circular motion to the mother liquor to increase the sinking velocity of crystals growing therein. A vacuum evaporation crystallizer which may be used to carry out the process of this invention comprises a substantially cylindrical shell, a centrally located vertical tube in the bottom of said shell, baffles having a lower opening disposed about the upper end of said tube, said bafflles dividing said shell into an upper evaporation chamber and a lower chamber, a propeller in said tube, a snail at the lower end of said tube, means driving said propeller drawing solution from said upper chamber down said tube to exhaust through said snail with a circular motion within said lower chamber to return to said upper chamber through the central lower opening of said baffles, and means drawing a vacuum in said upper chamber.

DESCRIPTION OF THE PREFERRED EMBODIMENT

Figure 1:
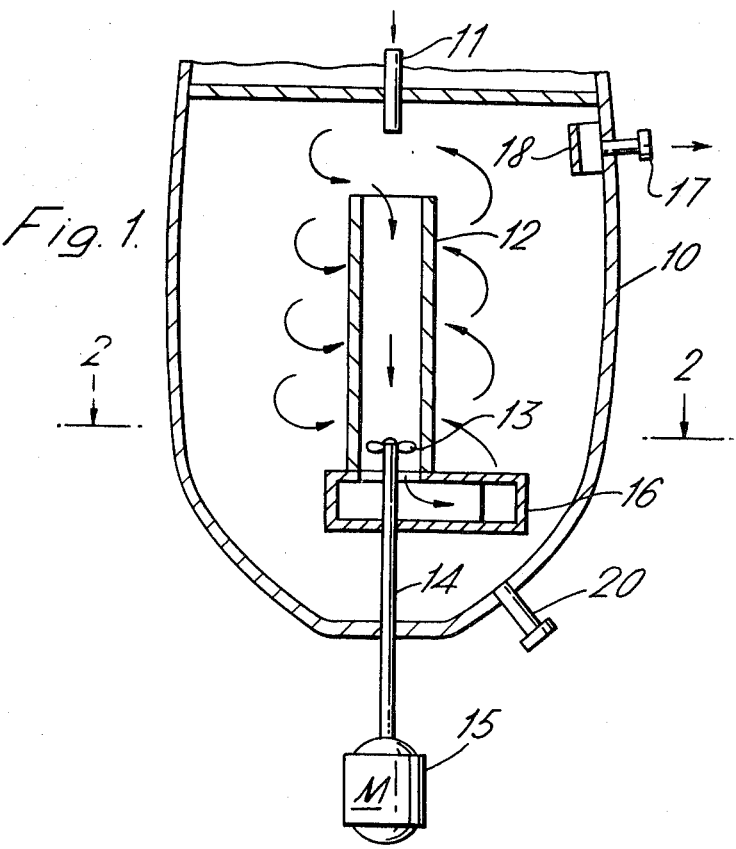
FIG. 1 is a vertical section through a chamber of a crystallizer according to this invention.
Figure 2:
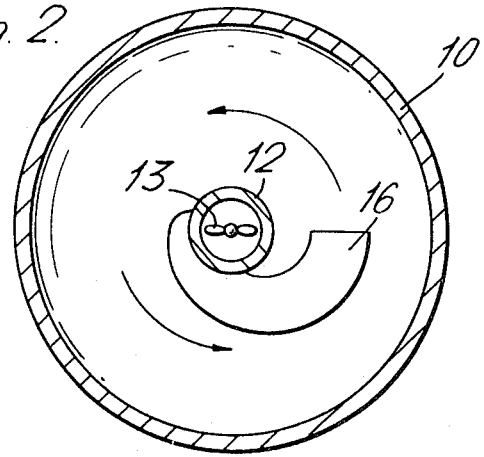
FIG. 2 is a section taken on line 2—2 of FIG. 1.

Referring to the drawing in detail, FIGS. 1 and 2 show a chamber 10 of a crystallizer of any type which has a cooled solution of a mother liquor introduced into it through pipe 11. A central vertical channel 12 extends within chamber 10 and contains a propeller 13 mounted on shaft 14 to be driven by motor 15. Propeller 13 draws solution downward through channel 12 to exhaust it through the snail 16 to impart a rapid circular motion to solution within chamber 10. A clear overflow may be withdrawn through pipe 17 behind baffle 18 and a crystal slurry may be withdrawn through fitting 20.

Figure 3:
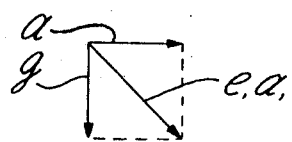
FIG. 3 is a vector diagram showing the acceleration to which a mother liquor in which crystals are growing may be subjected.

Arrow or vector $g$ in FIG. 3 represents the acceleration to which the mother liquor is subjected due to the action of gravity. Vector $a$ represents the acceleration to which the mother liquor is subjected due to its circular motion. The resulting effective acceleration is indicated by the vector $e.a.$ Thus, as has been described, crystal growth will be somewhat proportional to this vector $e.a.$, all other conditions being equal or neutralized.

Figure 4:
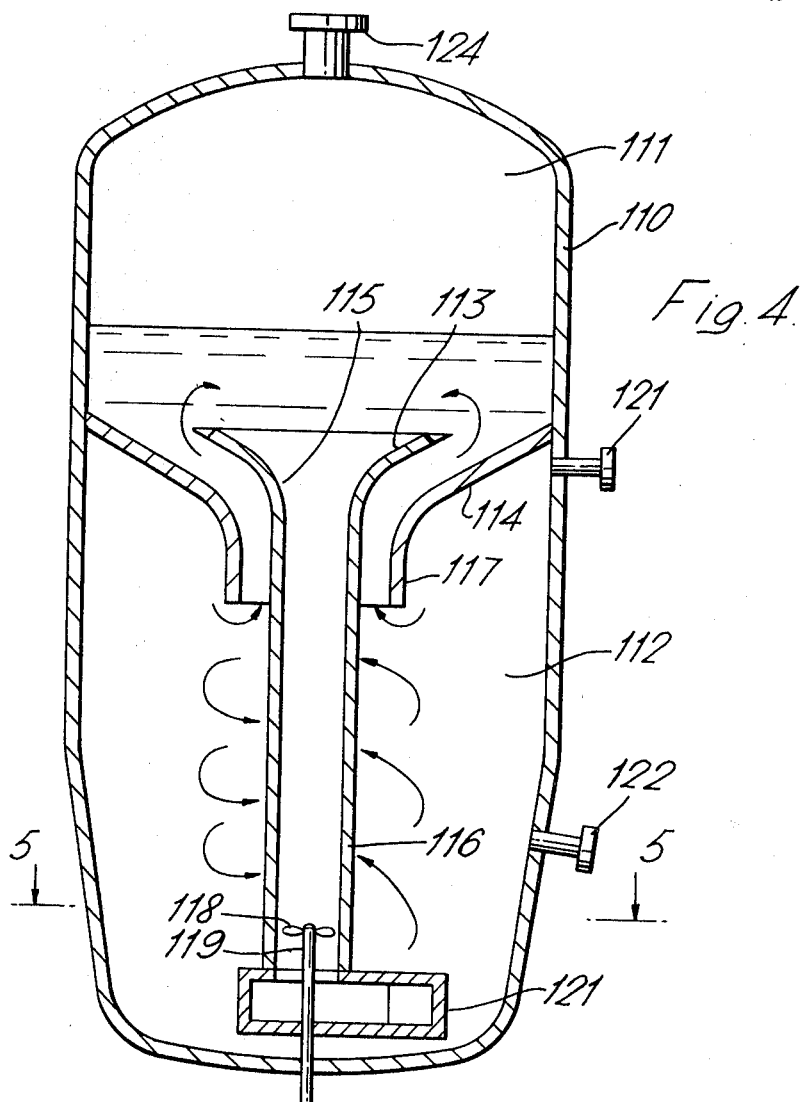
FIG. 4 is a longitudinal vertical section through a crystallizer according to this invention.
Figure 5:
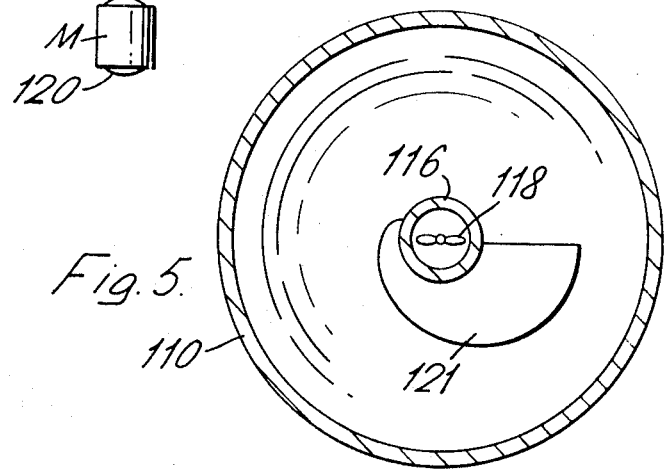
FIG. 5 is a section taken on line 5—5 of FIG. 4.

FIGS. 4 and 5 show the concept of this invention applied to a vacuum evaporation crystallizer. This vacuum evaporation crystallizer has a generally cylindrical shell 110 which is divided into an upper evaporation chamber 111 and a lower chamber 112 by the conical baffles 113 and 114. The inner conical baffle 113 contains a central opening 115 from which the tube 116 extends downward. The periphery of baffle 113 does not extend to shell 110. Baffle 114 extends from shell 110 below baffle 113 to terminate in a downward extending lip 117 adjacent to the central tube 116.

A propeller 118 is mounted on shaft 119 within tube 116 to be driven by motor 120. Propeller 118 draws solution downward within tube 116 to exhaust it through snail 121 to impart a strong rotary motion to the solution within chamber 112. Since crystal growth depends upon the sinking velocity of crystals in a motor liquor, the rotary motion of the solution in chamber 112 accelerates the solution to increase the crystal sinking velocity and thereby the rate of crystal growth. This may result in either a smaller crystallizer for a given capacity, or a more efficient crystallizer of a given size. The circular motion of the solution in chamber 112 throws heavier crystals outward so that they are less likely to pass upward into chamber 111 adjacent to the central tube 16.

A clear liquor overflow may be withdrawn from pipe 121 and a crystal slurry from fitting 122. A condenser and vacuum pump (not shown) is connected to fitting 124.

What is claimed is:
1. In a vacuum evaporation crystallizer,
   (a) a substantially cylindrical crystallization chamber, for holding a mother liquor, having a generally cylindrical shell having means defining said crystallization chamber in the lower portion of said shell and defining an evaporation chamber in the upper portion of said shell;
   (b) means cooling mother liquor associated with said crystallization chamber;
   (c) means rotating said mother liquor within said crystallization chamber, increasing the acceleration acting on said mother liquor and crystals growing therein;

(d) means drawing a vacuum in said evaporation chamber, cooling mother liquor therein; and (e) means circulating mother liquor between said evaporation chamber and said crystallization chamber, also wherein said means circulating mother liquor between said evaporation chamber and said crystallization chamber comprise a vertical funnel having an open lower end opening into an involute snail type duct arranged transverse to the axis of the funnel, a motor driven shaft in the axis of the funnel penetrating the lower end of the crystallizer, the involute duct and the lower end of the funnel, a propeller on the end of the shaft disposed in the lower end of the funnel.

References Cited

UNITED STATES PATENTS

| 1,428,557 | 9/1922 | Ray | 159—45 |
| 3,071,447 | 1/1963 | Bernhardi | 23—273 |
| 1,945,281 | 1/1934 | Leithauser | 159—45 |

FOREIGN PATENTS

| 1,016,245 | 9/1957 | Germany | 23—273 |

NORMAN YUDKOFF, Primary Examiner

R. T. FOSTER, Assistant Examiner

U.S. Cl. X.R.

159—45